US006522881B1

(12) United States Patent
Feder et al.

(10) Patent No.: US 6,522,881 B1
(45) Date of Patent: Feb. 18, 2003

(54) METHOD AND APPARATUS FOR SELECTING AN ACCESS POINT IN A WIRELESS NETWORK

(75) Inventors: Peretz M. Feder, Englewood, NJ (US); Walter Honcharenko, Monmouth Junction, NJ (US); Haim S. Ner, Fair Lawn, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/520,715

(22) Filed: Mar. 8, 2000

(51) Int. Cl.[7] .................................................. H04R 7/20
(52) U.S. Cl. ........................................ 455/437; 455/434
(58) Field of Search ................................. 455/434, 437, 455/438, 445, 447, 448, 454, 464, 414, 428, 9, 507, 511, 513, 671

(56) References Cited

U.S. PATENT DOCUMENTS

| | | | |
|---|---|---|---|
| 5,361,258 A | * 11/1994 | Arnold et al. | 370/330 |
| 5,583,866 A | * 12/1996 | Vook et al. | 340/825.73 |
| 5,594,731 A | * 1/1997 | Reissner | 370/338 |
| 5,793,765 A | * 8/1998 | Boer et al. | 370/400 |
| 5,969,678 A | * 10/1999 | Stewart | 342/457 |
| 5,987,062 A | * 11/1999 | Engwer et al. | 370/251 |
| 6,002,918 A | * 12/1999 | Heiman et al. | 340/7.23 |
| 6,111,867 A | 8/2000 | Mann et al. | |
| 6,259,898 B1 | * 7/2001 | Lewis | 370/338 |

FOREIGN PATENT DOCUMENTS

| | | |
|---|---|---|
| DE | 198 04 185 | 8/1999 |
| EP | 0 892 570 | 1/1999 |

OTHER PUBLICATIONS

European Search Report dated Dec. 14, 2001.

* cited by examiner

Primary Examiner—William Trost
Assistant Examiner—Congvan Tran
(74) Attorney, Agent, or Firm—Harness, Dickey & Pierce, P.L.C.

(57) ABSTRACT

A method and apparatus for use in a wireless communications network searches for the best serving access point of a base station as a function of communication link quality and load levels, thereby allowing a subscriber terminal to react to changes in RF conditions and load levels. In one implementation, a wireless modem in a fixed wireless access network initiates an access point searching algorithm in response to a triggering condition, such as initially powering-up the subscriber terminal or degradation of communication link quality or load levels. After detecting beacons for a plurality of neighboring access points, the wireless modem selects the best access point as a function of communication link quality and relative load levels to maintain adequate service quality and to react to changes in load levels. After an initial selection, the wireless modem may continually monitor quality/load conditions to determine whether to select a new access point.

22 Claims, 6 Drawing Sheets

METHOD AND APPARATUS FOR SELECTING AN ACCESS POINT IN A WIRELESS NETWORK

BACKGROUND OF THE INVENTION

1. Field of the Invention

The present invention relates to wireless communications, and more particularly to a technique for selecting an access point in a wireless network.

2. Description of Related Art

Consumer demand for high-speed access to Internet and intranet related services and applications has resulted in several high-bandwidth access network alternatives, such as DSL (Digital Subscriber Line) broadband networks, all fiber networks, ISDN (Integrated Services Digital Network), and fixed wireless networks.

Fixed wireless provides a viable alternative to traditional wire-based access, particularly in geographic regions where the costs of upgrading and maintaining wireline connections are high. Essentially, a fixed wireless network is a cellular network which relies on short-range transmitter/receiver ("transceiver") base stations to serve subscribers in small regions ("cells") of a larger service area. By dividing a service area into cells with limited range transceivers, the same frequencies can be reused in different regions of the service area, and subscriber terminals which consume relatively little power can be used to communicate with a serving base station.

FIG. 1 illustrates a conventional wireless internet access system (WIAS), which is one specific implementation of fixed wireless technology having four major components: (1) multiple data base stations (BS) 100(a) and 100(b) which provide wireless connectivity and radio coverage to subscriber units 102(a)–(d) (for example, residential and corporate terminal equipment as illustrated in FIG. 1); (2) wireless modems ("WMs") 170(a)–(c) which allow the subscriber units 102(a)–(d) to communicate with BS 100(a) or 100(b) via forward (base station to subscriber) and reverse (subscriber to base station) air-interface links 115 (a)–(c); (3) a data switching center (DSC) 125 for routing data packets to/from BS 100(a) and 100(b); and (4) a backbone transmission network 135, such as public IP (Internet Protocol) network, connected to the DSC 125.

Subscriber units may connect to the backbone transmission network 135 in various ways, examples of which are shown in FIG. 1. Corporate terminals 102(c) and 102(d) are connected to the backbone transmission network 135 via a local area network (LAN), a wireless router and/or firewall (not shown), and a shared WM 170(c), while subscriber units 102(a) and 102(b) each have their own dedicated WM 170(a), 176(b). BS 100(a) and 100(b) may be directly connected to the DSC 125 or communicate with the DSC 125 via a service provider's private IP network 127.

FIG. 2 illustrates an exemplary cell pattern suitable for implementing fixed wireless access. As seen in FIG. 2, each BS 100(a) and 100(b) provides 360° RF service coverage to subscriber terminals in cells 150(a) and 150(b), respectively, by transmitting and receiving signals over air-interface channels in designated frequency blocks (e.g., 5 MHz wide transmit frequency blocks and 5 MHz receive frequency blocks). Typically, cell coverage is sectorized, such that the frequency block designated for a given cell is distributed among a plurality of sectors (e.g., for a five sector per cell configuration, each sector being assigned a 1 MHz block for transmitting and a 1 MHz block for receiving). Therefore, each BS 100(a) and (b) includes a plurality of access points ("APs", not shown in FIG. 1), one per sector.

Depending on the location of a subscriber's WM relative to cell/sector boundaries and the radio frequency (RF) propagation characteristics of the surrounding area, the subscriber may be capable of communicating with multiple APs, i.e., multiple APs for a single cell and/or APs from different cells. For example, a subscriber's WM may be at or near the boundary of two or more sectors and/or two or more cells. In present implementations of fixed wireless access, the installer of the subscriber's WM selects a single AP during setup based on forward link signal strength, and the assignment of the AP which transmits/receives to/from the subscriber's WM does not change.

Due to changing RF propagation characteristics of the surrounding area, however, the AP which provides the best performance during installation will often not always be the best or even a suitable AP for ensuring adequate service quality or data throughput rates. For example, temperature and climatic changes, particularly moisture levels which change reflection coefficients, can significantly affect RF propagation between the AP and a subscriber's WM. Furthermore, degradation of service may result if the AP assigned to the user temporarily fails, or the sector served by the AP becomes overloaded. Still further, a more suitable AP may be subsequently deployed by the service provider (e.g., as a result of growth and "cell-splitting").

Therefore, the need exists for an agile AP selection and assignment technique which allows a subscriber's WM to select and switch between serving APs in response to network conditions.

SUMMARY OF THE INVENTION

The present invention is a method and apparatus for selecting an access point in a wireless communications network which is able to maintain adequate service quality and throughput rates under dynamic network conditions. In one embodiment, the present invention is a technique for selecting and assigning an access point in a fixed wireless network which monitors control signals transmitted by a plurality of neighboring access points and selects the best access point as a function of a communication link quality metric, such as signal strength at the user location, signal quality at the user location, signal strength at the access point, signal quality at the access point, packet error rate ("PER") at the wireless modem, PER at the access point, or a combination of two or more of these measurements, and relative sector load levels.

By dynamically selecting the best serving access point as a function of the communication link quality metric and relative load levels, the subscriber's wireless modem is able to adapt to changing RF propagation characteristics of the surrounding area to maintain high service quality and throughput rates, and is also able to avoid service outages by directing traffic away from a failed or overloaded access point.

In one exemplary implementation, a wireless modem in a fixed wireless network executes an AP search/selection sequence in response to a triggering event, such as when the wireless modem is initially powered-up, when service quality degrades below a threshold level, when sector load exceeds a threshold, or when instructed by the serving AP to do so, to (re)select an access point. When a triggering event has occurred, the subscriber's wireless modem detects an access control signal, commonly referred to as a "beacon", transmitted from a plurality of neighboring access points. An access point's beacon identifies the access point, includes a neighbor list to identify neighboring access points and the frequency channel on which such neighboring access points are transmitting, and includes a field which indicates the access point's load level. After detecting beacons and obtaining a communication link quality metric for each neighboring access point, the wireless modem selects the best access point based on the communication link quality metric and relative load levels.

By considering relative load levels, adequate throughput rates can be maintained by distributing service among a greater number of access points when possible (i.e., achieving load balancing). Furthermore, by initiating access point re-selection when service quality degrades below a threshold level, or when sector load exceeds a threshold, the subscriber's wireless modem is able to react to changes in RF propagation conditions in the surrounding area, such as temperature and other climatic changes which affect communication quality.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention, and wherein.

DETAILED DESCRIPTION

The present invention is a method and an apparatus for (re)selecting an AP in a wireless communications environment, such as a fixed wireless access network. In one embodiment, the present invention is implemented as a search algorithm performed by a subscriber's WM to dynamically select an AP as a function of relative communication link quality and load levels to maintain adequate performance and data throughput rates, even when RF propagation characteristics of the service area change and/or AP failure or overload occurs. An embodiment of the present invention will be described with reference to FIGS. 3A, 3B, and 4–6. Initially, exemplary base station and subscriber terminal architectures will be described. Although specific base station and subscriber terminal configurations are detailed below, it should be recognized that such details are for illustration purposes and that the present invention may be implemented in various wireless network configurations.

Figure 1:
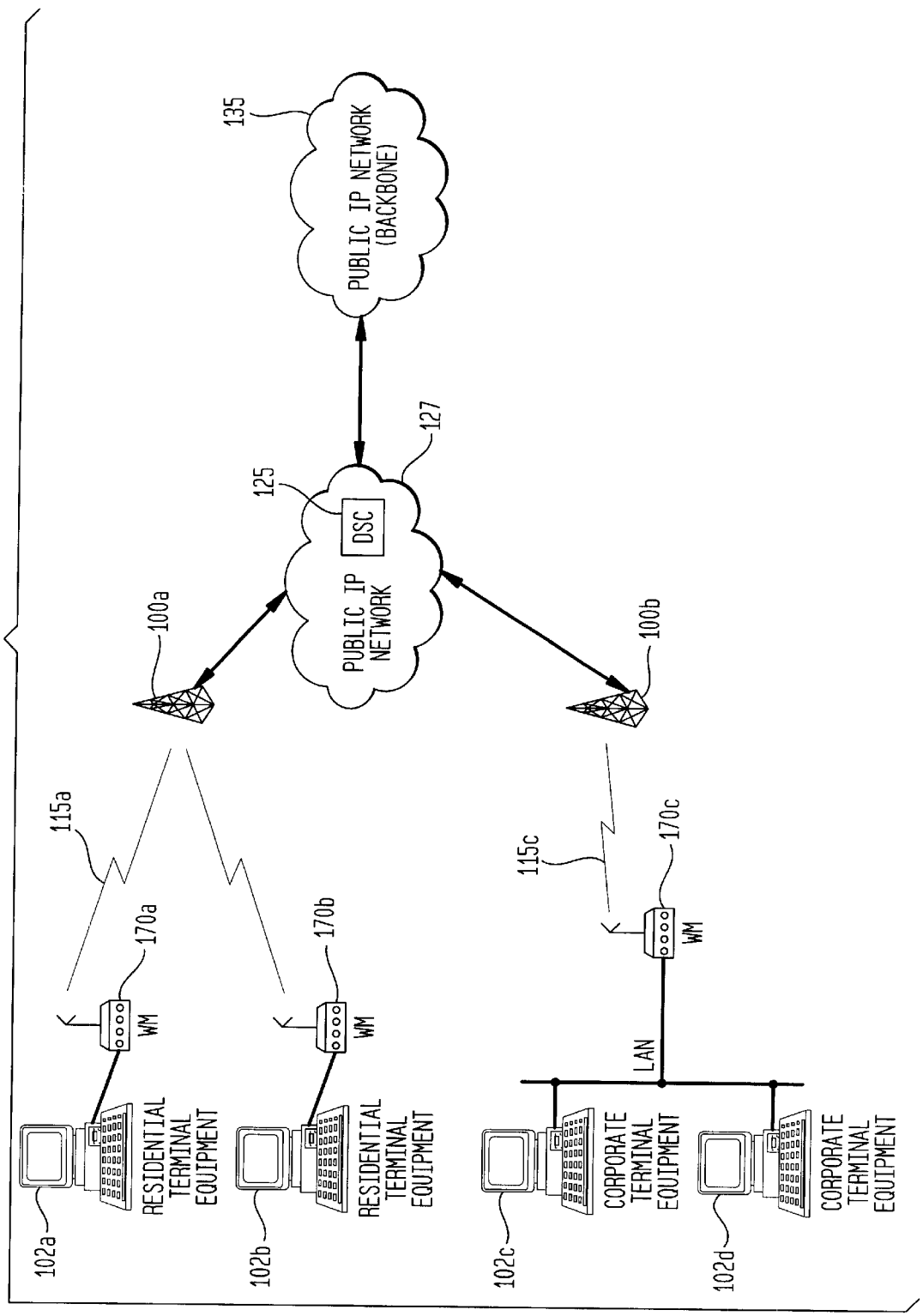
FIG. 1 illustrates an exemplary wireless internet access configuration system which is one suitable environment for implementing embodiments of the present invention.
Figure 2:
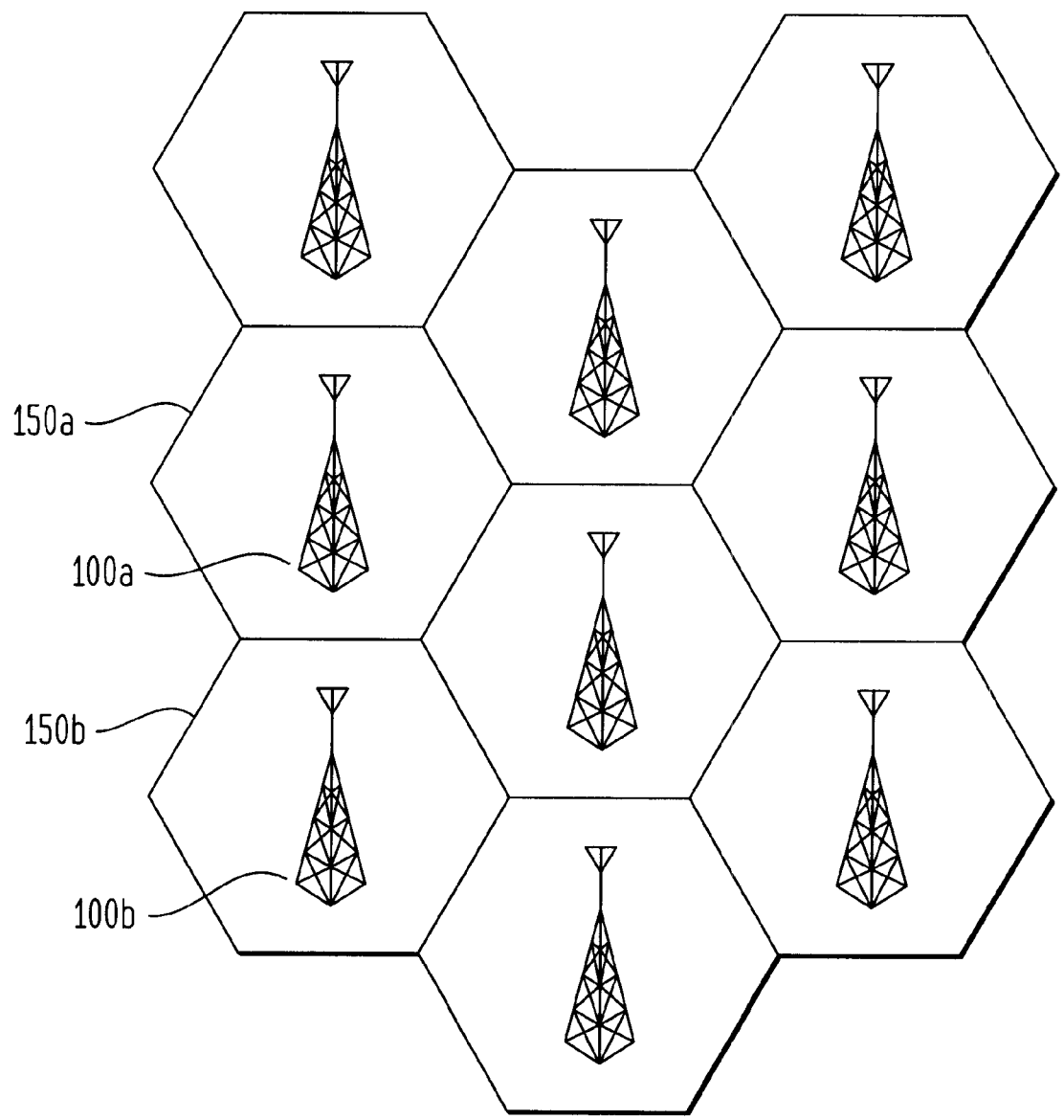
FIG. 2 illustrates an exemplary cell pattern layout for a fixed wireless access network.
Figure 3A:
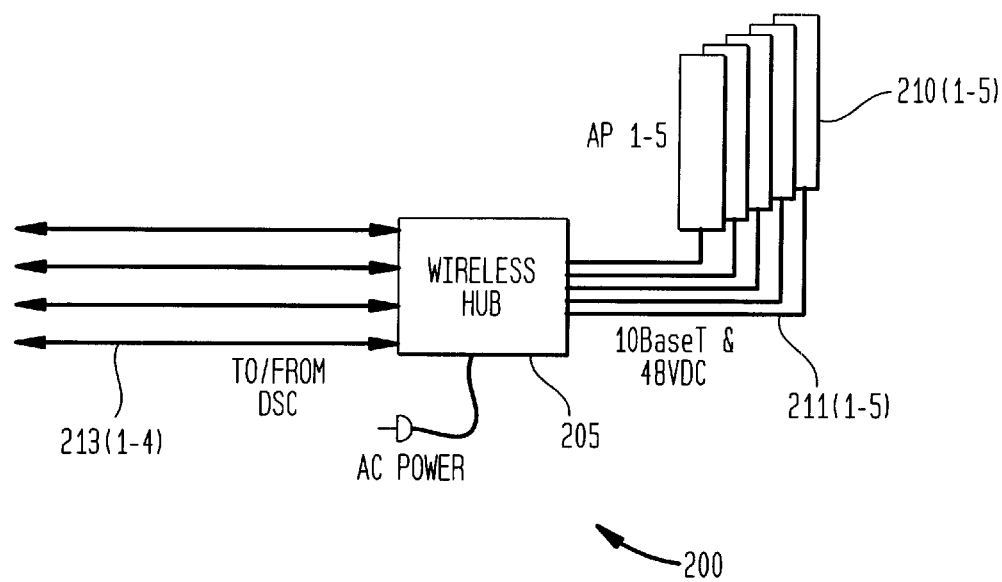
FIG. 3A generally illustrates an exemplary base station configuration suitable for implementing embodiments of the present invention.

FIG. 3A generally illustrates an exemplary base station suitable for use in accordance with an embodiment of the present invention. In FIG. 3A, a base station 200 includes a wireless hub 205 and at least one AP 210. Preferably, the base station 200 includes five APs 210(1–5) for serving five sectors of 72° coverage each. Assuming each base station in the network service area is assigned the same 5 MHz wide spectrum blocks for transmitting and receiving, each of the five APs 210(1–5) is assigned a different 1 MHz channel for transmitting and a separate 1 MHz channel for receiving.

Wireless hub 205 is preferably a signal router and power supply that supplies each AP 210 with voltage and data (for example, 48V DC and standard 10Base-T LAN data) through cables 211(1–5), such as 10Base-T cables. All radio and signal processing functions (i.e., transmitting and receiving for BS 200) are performed by the APs 210(1–5). Further, the wireless hub 205 provides connections 213(1–4) to/from the DSC (not shown).

Figure 3B:
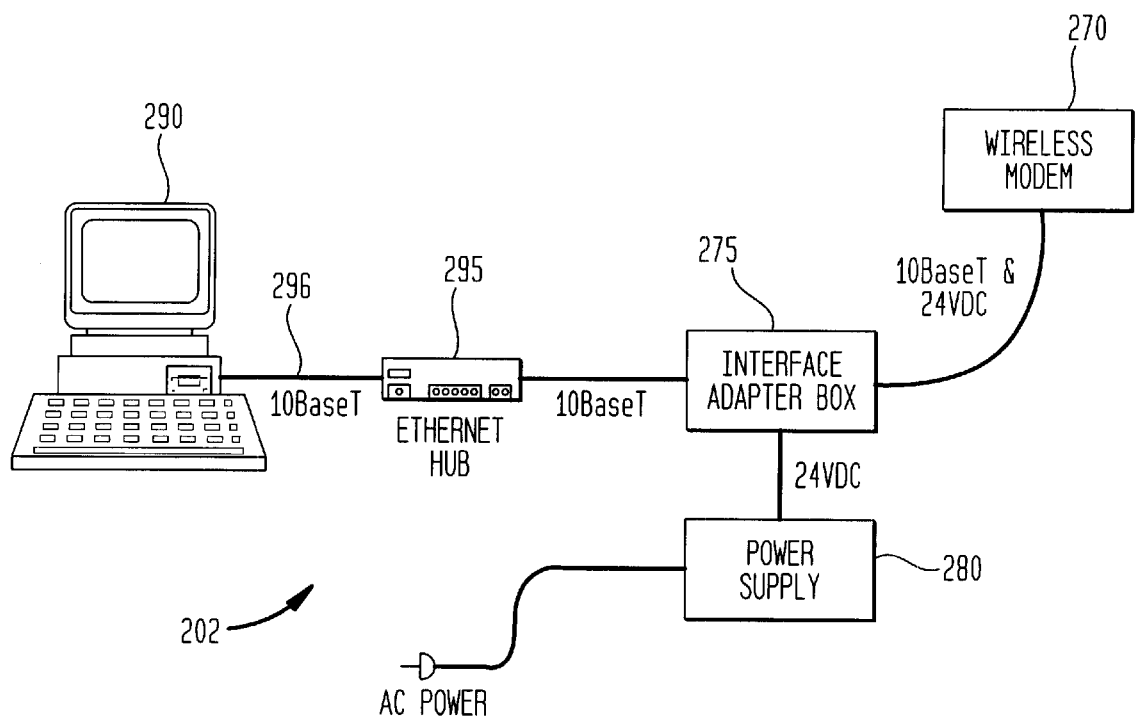
FIG. 3B generally illustrates an exemplary subscriber terminal configuration suitable for implementing embodiments of the present invention.

FIG. 3B generally illustrates an exemplary subscriber terminal configuration 202 suitable for use in accordance with an embodiment of the present invention. The subscriber terminal 202 includes a WM 270, an interface adapter box 275, and a power supply 280 (for example, a 24V DC power supply). The WM 270 is preferably attached to a subscriber's home or office near the rooftop to communicate with a selected AP 210. A PC 290 is connected to the interface adapter box 275 to send/receive data using the WM 270, e.g., via an ethernet hub 295 and a 10Base-T cable 296 for implementation in a LAN environment.

Both the WM 270 and the AP 210 have radio units with receiver and transmitter circuitry, each providing respective transmit and receive functions. A reverse link (subscriber to base station) signal transmitted from the WM 270 to the AP 210 preferably operates in a 1 MHz RF channel between approximately 3450–3500 MHz, whereas a forward link (base station to subscriber) signal transmitted from the AP 210 to the WM 270 preferably occupies a 1 MHz RF channel between approximately 3550–3600 MHz. Further, both radio units have an automatic gain control (AGC) function to provide linear demodulation over a wide dynamic range; a receive signal strength indication (RSSI) function to enable digital control of the AGC and for use in the AP search algorithm discussed below; and both radio units perform modulation and demodulation, for example using quadrature phase shift keying (QPSK) or quadrature amplitude modulation (QAM) techniques.

Figure 4:
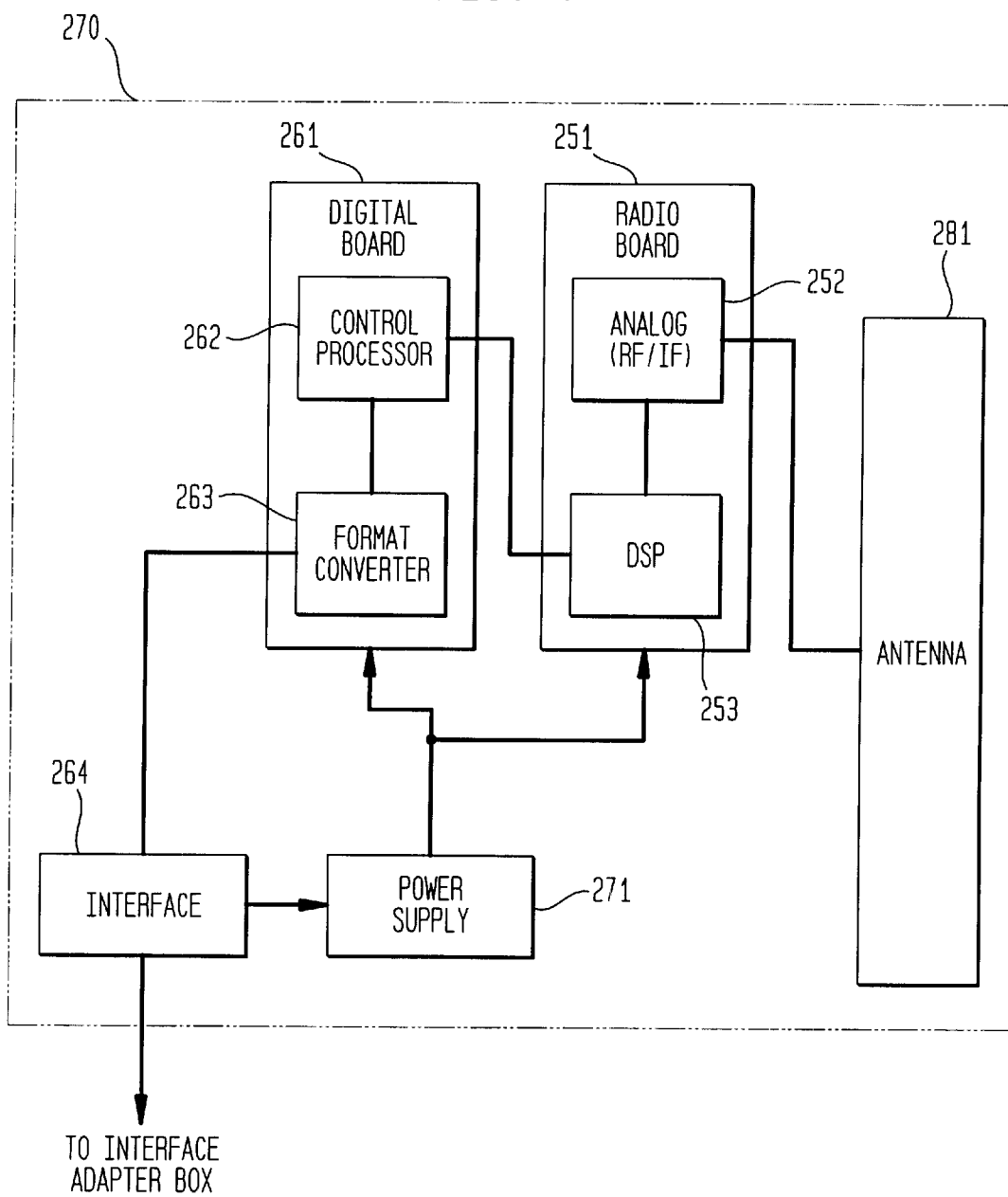
FIG. 4 is a block diagram depicting select components of a wireless modem in accordance with an embodiment of the present invention.

FIG. 4 is a block diagram depicting an exemplary architecture of the WM 270. In the exemplary configuration of FIG. 4, the WM 270 includes: (1) a WM antenna 281; (2) a radio board 251; (3) a digital board 261; (4) a power supply 271; and (5) an interface 264. The radio board 251 converts RF signals received from an AP 210 via the WM antenna 281 to digital signals, and converts digital transmit signals to analog RF signals which are then transmitted by the WM antenna 281. The radio board 251 includes an analog RF/IF processing unit 252 which performs such analog/digital conversion, and which down-converts signals received by the WM antenna 281 to an intermediate frequency (IF) signal. The radio board also includes a digital signal processor (DSP) 253 which demodulates the IF signals output by the analog RF/IF processing unit 252. The DSP 253 also modulates signals received from the digital board 261 to be transmitted, the modulated signals then being up-converted to RF signals by the analog RF/IF processing unit 252.

The digital board 261 includes a control processor 262 which provides medium access control (MAC) and protocol functions, such as the timing of data transmissions. As discussed in greater detail below, the control processor 262 also executes an AP search/select algorithm according to an embodiment of the present invention. The digital board 261 also includes a format converter 263 which converts the MAC format data output by the control processor 262 to a data stream, such as a standard 10Base-T data stream, for output to the subscriber's PC 290 (not shown) via an interface 264. The power supply 271 supplies power to the power radio board 251 and the digital board 261.

Figure 5:
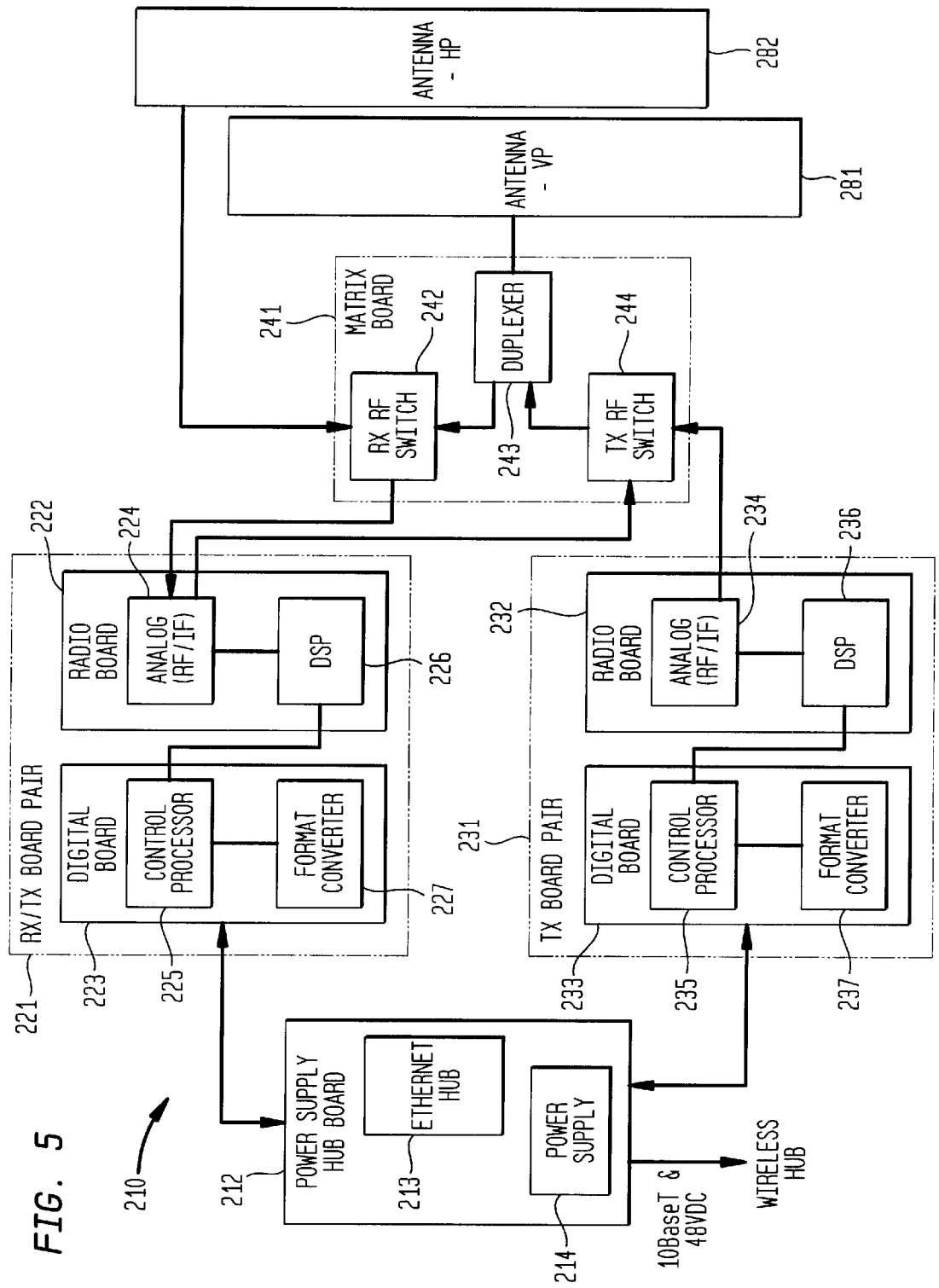
FIG. 5 is a block diagram depicting select components of an access point in accordance with the preferred embodiment.

FIG. 5 is block diagram of an exemplary architecture of the AP 210 which is suitable for use in accordance with the present invention. In the exemplary configuration of FIG. 5, the AP 210 includes: (1) a horizontally polarized antenna 282; (2) a vertically polarized antenna 281; (3) a matrix board 241; (4) an RX/TX board pair 221; (5) a TX board pair 231; and (6) a power supply/hub board 212.

Like the WM 270 of FIG. 4, the AP 210 includes respective radio and digital boards which perform the functions discussed above. The AP 210 has both a receiving/transmitting (RX/TX) board pair 221 and a transmission (TX) board pair 231, each having respective radio boards 222 and 232 and digital boards 223 and 233. Radio boards 222, 232 each include an analog RF/IF processing unit 224, 234 and a DSP 226, 236, and each digital board 223, 233 includes a control processor 225, 235 and a format converter 227, 237.

The RX/TX board pair 221 transmits and receives when the AP 210 is used in a half duplex mode (i.e., the AP uses only one board to perform sequential transmit and receive functions), and functions like radio and digital boards 251 and 261 of the WM 270 described above. The TX board pair 231 is used to transmit when the AP 210 is used in full duplex mode (i.e., when the AP is transmitting and receiving simultaneously).

The matrix board 241 selects the desired board pair for transmission and/or reception and the best antenna for reception (the vertically polarized antenna 281 or the horizontally polarized antenna 282) via switches 242 and 244. A duplexer 243 isolates receive and transmit frequencies on the vertically polarized antenna 281, while a separate receive filter (not shown) filters the signals received from the horizontally polarized antenna 282. Signals are always transmitted on the vertically polarized antenna 281, whereas reception of signals occurs at both antennas, with the RX/TX board pair 221 determining which of the two signals to select based on performance. The power supply/hub board 212 includes a power supply 214 for providing power to the radio boards 222, 232, the digital boards 223, 233, and the matrix board 241, and an ethernet hub 213 for sending/receiving data streams to/from the digital boards 223, 233.

Figure 6:
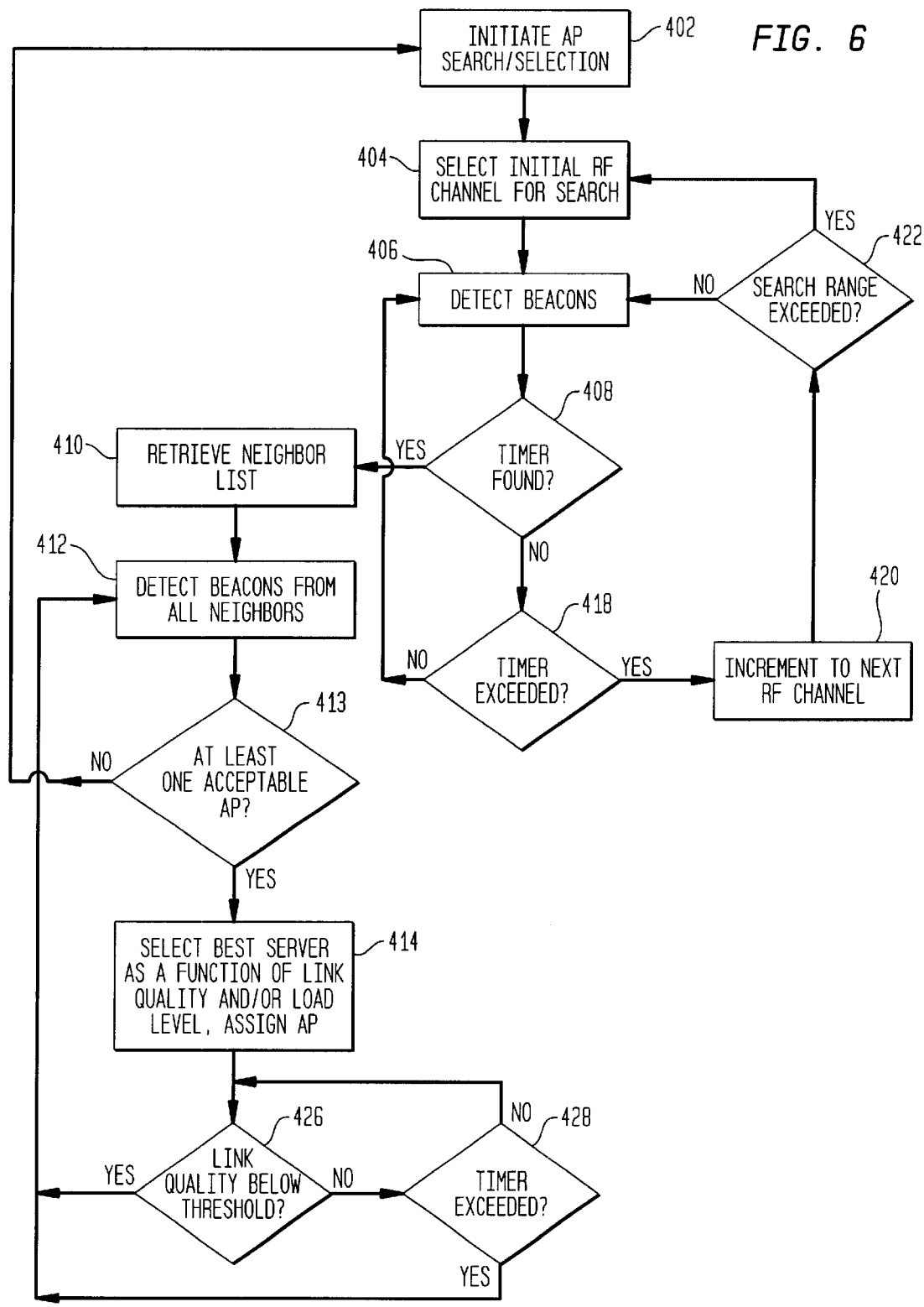
FIG. 6 is a flow diagram for an access point search/selecting sequence according to an embodiment of the present invention.

The operation of an AP search/selection technique according to an embodiment of the present invention will next be described with reference to the flow diagram of FIG. 6. The AP search/selection described below with reference to FIG. 6 can be performed by the control processor 262 of the WM 270.

The WM 270 performs a AP search/selection sequence upon determining that a triggering event has occurred. A number of different occurrences may constitute a triggering event. For example, the WM 270 may perform AP search/selection each time the subscriber's terminal is powered-up, at predetermined time intervals, when a deterioration of service quality or an increased load level is detected, or as instructed by a previously selected AP.

When the AP search/selection is initiated (step 402), the subscriber's WM 270 selects an initial RF channel to search for APs (Step 404). Because the same frequencies are used throughout the wireless network region, only a limited number of channels are available. The WM 270 may select any possible frequency channel within a search range as the initial RF channel (e.g., the lowest frequency channel or the highest frequency channel).

Each frame transmitted by an AP includes access control information, commonly referred to as a "beacon." In accordance with the present invention, each beacon identifies the transmitting AP, indicates the load level for the AP, and includes a neighbor list to identify a number of (e.g., 8) neighboring APs and the channels on which each neighboring AP is transmitting. The beacon may further include control information, such as data packet acknowledgements ("ACKs"). The WM 270 attempts to detect a beacon transmitted by an AP on the initial RF channel (step 406). When a beacon is found on the selected channel (step 408), the WM 270 extracts the neighbor list from the detected beacon (step 410) to identify neighboring APs and their assigned channels. Using the extracted neighbor list information, the WM 270 detects the beacons from each neighboring AP (step 412).

If the WM 270 does not detect a beacon on the assigned RF channel within a predetermined time period, e.g., 10 seconds (step 418), a new RF channel is selected (step 420). If the newly selected RF channel is within the channel search range (step 422), the WM 270 attempts to detect beacons on the newly selected channel (step 406). If the newly selected RF channel is not within the channel search range (i.e., is higher/lower than the highest/lowest channel in the search range), the WM 270 re-selects the initial RF channel (step 404) for attempted beacon detection (step 406).

After retrieving a neighbor list from a detected beacon at step 410 and detecting beacons from neighboring APs (step 412), the WM 270 determines if there is at least one acceptable AP based on a communication link quality metric (step 413), and, if so, selects a single AP based on the communication link quality metric and relative AP load levels (step 414). The communication link quality metric can be one of signal strength at the WM 270 (e.g., RSSI), signal quality at the WM 270, signal strength at the AP 210, and signal quality at the AP 210, or a combination of two or more of these measurements. Signal quality can be represented by any number of measurements, including signal-to-noise ratio, bit error rate, frame error rate, packet acknowledgement percentage (i.e., the percentage of transmitted packages which are acknowledged), etc.

Signal strength/quality at the WM 270 indicates forward link quality, while signal strength/ quality at the AP 210 indicates reverse link quality. One or more measurements which indicate forward link quality and one or more measurements which indicate reverse link quality can be combined to obtain a communication link quality metric which represents communication link quality in both forward and reverse directions (i.e., bi-directional link quality). If no AP has an acceptable communication link quality metric (step 413), the WM 270 reinitiates the AP search/selection (step 402).

Relative AP load levels are also considered at step 414 to select the best AP. For example, if the AP with the highest communication link quality metric also has a load level which is below a threshold, that AP is selected. If each AP having an acceptable communication link quality metric also has a load level which exceeds the threshold, then the AP with the best communication link quality metric is selected. If some of the APs which have an acceptable communication link quality metric have a load level which exceeds the threshold but at least one such AP has a load level which is below the threshold, the AP with the lowest load level is selected. Load level may be represented by any number of measurements. For example, the average data throughput per user multiplied by the number of users can be calculated at the AP 210. Other measurements, such the average number of bits being transmitted by the AP 210 per second, the "CPU up-time" at the hub, and/or data buffer overflow conditions, can be monitored to indicate load.

After the WM 270 has assigned the best AP at step 414, subsequent changes in service quality and/or load levels my cause the WM 270 to re-enter the AP search/selection sequence described above. For example, deteriorating forward link quality may cause the WM 270 to perform AP search/section (step 426). Also, the previously selected AP may explicitly instruct the WM 270 to perform the AP search/selection sequence, for example if reverse link quality drops below a threshold. Furthermore, the WM 270 may continuously or periodically monitor the load level for the serving AP and perform AP search/selection when the load level exceeds a threshold (step 428). If the WM 270 performs AP search/selection based on degraded service quality or an excessive load level for the previously selected AP (or if instructed by the AP to do so), the WM 270 uses the neighbor list received in the beacon of the previously selected AP to detect the beacons for neighboring APs (step 412) so that the best AP may be selected (step 414).

By implementing the above-described AP search/selection sequence, WMs may switch between APs based on local performance, which can change as a result of changing RF propagation conditions, signal levels, load levels, and network redesign. Furthermore, a subscriber's WM can select a new AP to avoid temporary service outages by directing traffic away from a failed or overloaded AP.

It should be apparent to those skilled in the art that various modifications and applications of the present invention are contemplated which may be realized without departing from the spirit and scope of the present invention. As one example, the subscriber terminal may include a mechanical control mechanism which positions the WM antenna 281. In this way, when a new AP is selected, the WM antenna 281 may be re-oriented to improve communication link quality for the newly-selected AP. Furthermore, the WM antenna 281 may be controlled to scan for beacons during the AP search/selection when determining the communication link quality metric for each AP in the neighbor list, so that the selection accuracy is improved. Furthermore, although the above-described embodiment specifies that the control processor of the WM 270 performs AP search/selection, it should be understood that the AP search/selection sequence and portions thereof can be implemented in any number of software-driven processing circuitry, application specific integrated circuits, or other arrangements. Still further, although the above-described embodiment specifies that the wireless modem obtains a neighbor list from a detected beacon, the wireless modem may obtain the neighbor list independent of a beacon.

What is claimed is:

1. A method of selecting an access point in a wireless communications network, comprising:
   detecting a beacon of an access point on a selected radio frequency search channel;
   obtaining a neighbor list from the detected beacon, the neighbor list indicating radio frequency channels associated with a plurality of neighboring access points;
   detecting a beacon of each of the neighboring access points on the radio frequency channels indicated in the neighbor list; and
   selecting a single access point as a function of the relative load levels associated with the access points.

2. The method of claim 1, wherein said step of selecting a single access point considers communication link quality associated with each of the access points.

3. The method of claim 2, wherein communication link quality is forward link quality.

4. The method of claim 2, wherein communication link quality is reverse link quality.

5. The method of claim 1, wherein detecting beacons is initiated when a load level associated with a currently serving access point exceeds a threshold.

6. The method of claim 1, wherein detecting beacons is initiated when communication link quality for a currently serving access point degrades below a threshold.

7. The method of claim 1, wherein detecting a beacon of an access point includes:
   setting an initial radio frequency search channel;
   determining whether a beacon can be detected on the initial radio frequency search channel; and
   setting an updated frequency search channel, within an acceptable range of search channels,
   wherein said step of setting an updated frequency search channel is repeated until a beacon can be detected.

8. The method of claim 1, wherein said wireless communications network is a fixed wireless access network.

9. The method of claim 8, wherein said steps of detecting beacons and selecting a single access point are performed by a wireless modem of the fixed wireless access network.

10. The method of claim 9, wherein said step of detecting a beacon of an access point is initiated when the wireless modem is powered-up.

11. The method of claim 2, wherein communication link quality is determined by receive signal strength measurements and/or signal quality measurements.

12. An apparatus for selecting an access point in a wireless communications network comprising:
   detecting means for
      detecting a beacon of an access point on a selected radio frequency search channel,
      obtaining a neighbor list from the detected beacon, the neighbor list indicating radio frequency channels associated with a plurality of neighboring access points, and
      detecting a beacon of each of the neighboring access points on the radio frequency channels indicated in the neighbor list; and
   selecting means for selecting a single access point as a function of the relative load levels associated with the access points.

13. The apparatus of claim 12, wherein said selecting means considers communication link quality associated with each of the access points when selecting the single access point.

14. The apparatus of claim 13, wherein communication link quality is forward link quality.

15. The apparatus of claim 13, wherein communication link quality is reverse link quality.

16. The apparatus of claim 12, wherein said detecting means initiates detecting beacons when a load level associated with a currently serving access point exceeds a threshold.

17. The apparatus of claim 12, wherein said detecting means initiates detecting beacons when communication link quality for a currently serving access point degrades below a threshold.

18. The apparatus of claim 21, wherein said detecting means detects a beacon by:
   setting an initial radio frequency search channel;
   determining whether a beacon can be detected on the initial radio frequency search channel; and
   setting an updated frequency search channel, within an acceptable range of search channels,
   wherein setting an updated frequency search channel is repeated until a beacon can be detected.

19. The apparatus of claim 12, wherein said wireless communications network is a fixed wireless access network.

20. The apparatus of claim 19, wherein said apparatus is a wireless modem of the fixed wireless access network.

21. The apparatus of claim 20, wherein said detecting means initiates detecting beacons when said wireless modem is powered-up.

22. The apparatus of claim 13, wherein communication link quality is determined by receive signal strength measurements and/or signal quality measurements.

* * * * *